(12) United States Patent
Guo et al.

(10) Patent No.: US 12,129,959 B2
(45) Date of Patent: Oct. 29, 2024

(54) TOOL-FREE ADJUSTABLE-TORQUE STAND SYSTEM

(71) Applicant: Toshiba Global Commerce Solutions, Inc., Durham, NC (US)

(72) Inventors: Jui Chieh Guo, Taipei (TW); Ming Lei Lin, Taipei (TW); Chenming Hsu, Taipei (TW); Yu Fen Hung, Taoyuan (TW)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 49 days.

(21) Appl. No.: 18/112,883

(22) Filed: Feb. 22, 2023

(65) Prior Publication Data

US 2024/0280210 A1    Aug. 22, 2024

(51) Int. Cl.
*F16M 11/10*    (2006.01)

(52) U.S. Cl.
CPC ....... *F16M 11/10* (2013.01); *F16M 2200/021* (2013.01)

(58) Field of Classification Search
CPC .............. F16M 11/10; F16M 2200/021; Y10S 248/923
USPC ........................................................ 248/923
See application file for complete search history.

(56) References Cited

U.S. PATENT DOCUMENTS

| | | | | |
|---|---|---|---|---|
| 1,787,309 A * | 12/1930 | Goldbeck | .......... | F16M 11/2014 396/419 |
| 2,041,615 A * | 5/1936 | Maslowski | ............ | B60N 2/161 248/421 |
| 2,525,534 A * | 10/1950 | Ernisse | ................. | F16M 11/18 248/650 |
| 4,527,766 A * | 7/1985 | Krenz | .................... | F16M 11/10 248/371 |
| 8,052,104 B2 * | 11/2011 | Clampitt | ............ | F16M 11/2014 248/176.1 |
| 8,870,284 B2 * | 10/2014 | Chapman | ............... | B60N 2/265 297/256.11 |

(Continued)

OTHER PUBLICATIONS

Unknown, Top 8 Spring-Assist Hinge Applications for Product Design, Feb. 17, 2021, Weber Knapp (available at https://blog.weberknapp.com/spring-assist-hinge-applications-for-product-design).

(Continued)

*Primary Examiner* — Eret C McNichols
(74) *Attorney, Agent, or Firm* — Kaufman & Canoles, P.C.

(57) ABSTRACT

Methods and systems of tool-free adjustment of torque used to maintain the viewing angle of a display stand are performed. In one exemplary embodiment, a method is performed by a device having a platform hingedly coupled to a base. A bar rotatably supported by the base includes a left-hand threaded portion, a right-hand threaded portion, and a grip configured to enable simultaneous rotation of both threaded portions. A first nut is in threaded engagement with the left-hand threaded portion, and a second nut is in threaded engagement with the right-hand threaded portion. A first spring is coupled to the first nut and the platform, and a second spring is coupled to the second nut and the platform. When the bar is rotated via the grip, the first and second nuts move in opposing directions to enable simultaneous tension adjustment of the first and second springs.

18 Claims, 7 Drawing Sheets

(56) References Cited

U.S. PATENT DOCUMENTS 8,931,193 B1 * 1/2015 Bogart ............... F41A 23/16
  42/1.06
11,796,127 B2 * 10/2023 Gan .................. F16B 9/054

OTHER PUBLICATIONS

Unknown, Learn More About our Spring-Assist Torque Hinge HG-TLAJ—Sugatsune Global, Nov. 9, 2020, Sugatsune Global (available at https://www.youtube.com/watch?v=AJNooe6pEBc).

* cited by examiner

300

302

BY A DISPLAY STAND DEVICE HAVING A PLATFORM HINGEDLY COUPLED AT ONE END THEREOF TO A BASE, A CONTROL BAR ROTATABLY SUPPORTED BY THE BASE AND INCLUDING A LEFT-HAND THREADED PORTION, A RIGHT-HAND THREADED PORTION, AND A GRIP CONFIGURED TO ENABLE SIMULTANEOUS ROTATION OF THE LEFTH-HAND THREADED PORTION AND THE RIGHT-HAND THREADED PORTION, A FIRST NUT IN THREADED ENGAGEMENT WITH THE LEFT-HAND THREADED PORTION, A SECOND NUT IN THREADED ENGAGEMENT WITH THE RIGHT-HAND THREADED PORTION, A FIRST SPRING IN TENSION COUPLED TO THE FIRST NUT AND TO THE PLATFORM, AND A SECOND SPRING IN TENSION COUPLED TO THE SECOND NUT AND TO THE PLATFORM

ROTATING THE GRIP SO THAT THE FIRST NUT AND SECOND NUT MOVE ALONG THE CONTROL BAR IN OPPOSING DIRECTIONS TO ENABLE SIMULTANEOUS ADJUSTMENT OF THE TENSION IN THE FIRST SPRING AND THE TENSION IN THE SECOND SPRING

TOOL-FREE ADJUSTABLE-TORQUE STAND SYSTEM

BACKGROUND

Display stands such as table top display stands often have a base that rests on a table top and a platform hingedly coupled to the base in a way that allows the platform to be titled at an angle relative to the base. The platform serves as a support for an item to be displayed (e.g., a display screen) at a desired tilt angle. The platform-to-base hinged coupling may be a torque hinge having a fixed force setting corresponding to an expected weight of an item that will be placed on the platform. However, when the item to be displayed has a weight that is less than or greater than the expected weight, it is difficult to keep the item at a desired tilt angle. That is, the fixed force setting either dominates the item's weight when the item is lighter than the expected weight, or the fixed force setting is dominated by the item's weight when the item is heavier than the expected weight. Further, torque hinges cannot be readily adjusted without tools and knowledge of how the torque hinge operates.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIG. 3 illustrates one embodiment of a method performed by a tool-free adjustable torque system in accordance with various aspects as described herein.

DETAILED DESCRIPTION

Figure 1A:
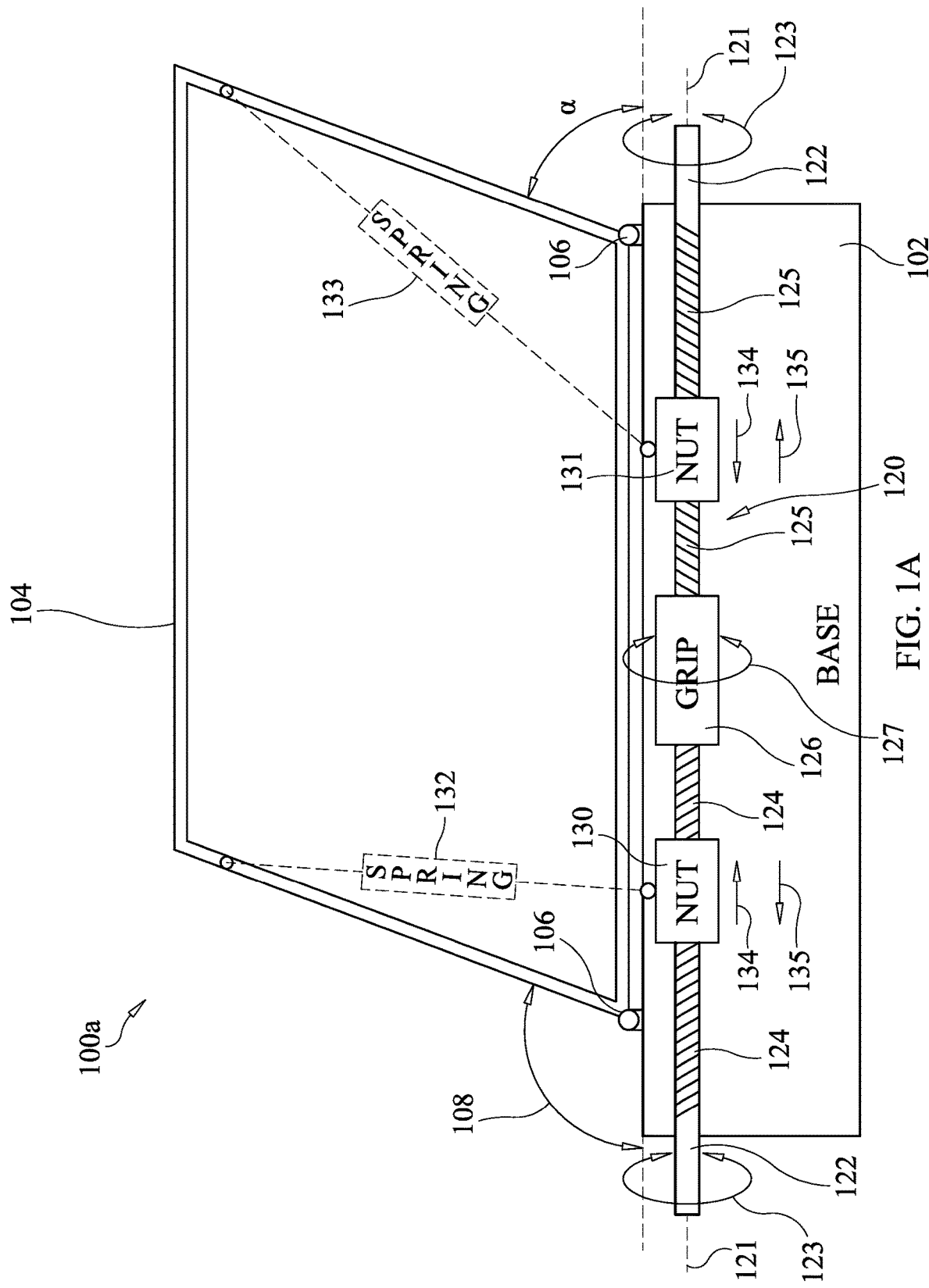
FIG. 1A illustrates one embodiment of a display stand having a tool-free adjustable torque system in accordance with various aspects as described herein.

For simplicity and illustrative purposes, the present disclosure is described by referring mainly to exemplary embodiments thereof. In the following description, numerous specific details are set forth in order to provide a thorough understanding of the present disclosure. However, it will be readily apparent to one of ordinary skill in the art that the present disclosure may be practiced without limitation to these specific details.

Table top display stands are used to support, for example, computer screens/displays. Such display stands have a base that rests on a table top and a platform hingedly coupled to the base. The platform may be tilted at an angle relative to the base such that a screen/display supported thereon is oriented at a suitable viewing angle for a user. The platform may be hingedly coupled to the base by a torque hinge whose factory-established force setting corresponds to an expected weight (or weight range) of a screen/display that will be placed on the platform. As long as the screen/display is at or within the weight constrictions associated with the torque hinge's force setting, the stand's platform will maintain a tilt/viewing angle set by a user. However, when the screen/display is lighter or heavier than the expected weight (or weight range), it is difficult to keep the screen/display at a desired tilt/viewing angle since the torque hinge is either under-loaded or overloaded. Further, torque hinges cannot be readily adjusted without tools and knowledge of how the torque hinge operates. Accordingly, there is a need for improved methods and systems for adjusting a display stand's ability to retain a desired tilt/viewing angle quickly, easily, and without the use of tools in order to accommodate a wide range of weights of, for example, screens/displays supported on the display stand.

In this disclosure, methods and systems are provided for the tool-free adjustment of the torque used to maintain the viewing angle of a display stand. In one exemplary embodiment, the device includes a frame hingedly coupled to a base. In one example, a platform is coupled to the frame. A bar having a longitudinal axis is supported by the base for rotation about the bar's longitudinal axis. The bar includes a left-hand threaded portion, a right-hand threaded portion, and a grip configured to enable rotation of the bar about the bar's longitudinal axis. In one example, the grip is disposed between the left-hand threaded portion and the right-hand threaded portion. A first nut is in threaded engagement with the left-hand threaded portion and a second nut is in threaded engagement with the right-hand threaded portion. A first spring is coupled to the first nut and to the frame (or platform), while a second spring is coupled to the second nut and to the frame (or platform). One of the benefits of the device is that the bar and its grip enable tool-free and simultaneous rotation of the bar's left-hand threaded portion and right-hand threaded portion such that the first nut and second nut move along the bar in opposing directions to enable simultaneous adjustment of tension in the first spring and tension in the second spring.

In one example of the present disclosure, FIG. 1A illustrates one embodiment of a display stand system 100a in accordance with various aspect as described herein. In FIG. 1A, the system 100a includes a base 102 and a frame 104 hingedly coupled to the base 102 at, for example, one or more hinge points 106 at one end of the frame 104. The base 102 may be made and configured in a variety of ways that enable the base 102 to rest on a support structure (not shown) such as a table top, a shelf, etc. The frame 104 may be a rigid frame, a jointed frame, an articulating frame, etc., configured to provide support for an object (e.g., a screen or display device). In some embodiments and as will be described later below, a support platform may be coupled to or integrated with the frame 104. The hinge points 106 may be simple or complex hinges that support tilting movement (as indicated by two-headed arrow 108) of the frame 104 relative to the base 102 that permits the frame 104 to be positioned at a desired angle α relative to the base 102 or the support structure on which the base 102 rests.

In FIG. 1A, the system 100a includes a bar 120 that may be coupled to or mounted on/in the base 102 in a way that supports rotation of the bar 120 about its longitudinal axis indicated by dashed line 121. For example, outboard ends 122 of the bar 120 may be supported by the base 102 in a way that permits rotation of the bar 120 about its longitudinal axis 121 in either of two rotational directions as indicated by two-headed arrows 123. In general, the hinging axis provided by the hinges 106 and the longitudinal axis 121 are spaced apart from one another to support tilting movement 108. The bar 120 includes two threaded portions 124 and 125, and a grip 126. The threaded portions 124 and 125 are reverse threaded, i.e., one of the portions 124/125 is left-hand threaded and the other of the threaded portions 124/125 is right-hand threaded. The grip 126 serves as a handgrip for grasping and rotation by a user as will be described further below. In the illustrated system 100a, the grip 126 is disposed between the threaded portions 124 and 125. For example, the grip 126 may be disposed at the central portion of the bar 120. In general, when the grip 126 is rotated in either of two directions as indicated by two-headed arrow 127, the entirety of the bar 120 undergoes rotation 123 about the bar's longitudinal axis 121. That is, when the grip 126 is rotated as indicated at 127, the threaded portions 124 and 125 experience corresponding rotation in the same rotation direction as that of the grip 126.

In FIG. 1A, the system 100a includes a nut 130 in threaded engagement with the threaded portion 124 and a nut 131 in threaded engagement with the threaded portion 125. A first spring 132 is coupled on one end thereof to the nut 130 and on its other end to the frame 104 such that the spring 132 is in tension for all tilt angles α. A second spring 133 is coupled on one end thereof to the nut 131 and on its other end to the frame 104 such that the spring 133 is in tension for all tilt angles α. In the system 100a, the springs 132 and 133 are coupled to the frame 104 at two unique locations thereof, e.g., the sides of frame 104. In one embodiment, the springs 132 and 133 are identical and/or have the same spring constant.

In use, the system 100a is operable to simultaneously adjust or control the spring tensions of the springs 132 and 133. For instance, when the system 100a needs to support a heavier object (e.g., a screen or display device), the grip 126 may be grasped by a user and rotated in one of the rotation directions 127 so that the nuts 130 and 131 move towards one another (as indicated by arrows 134) as dictated by the rotating threaded portions 124 and 125. However, when the system 100a needs to support a lighter object (e.g., a screen or display device), the grip 126 may be grasped by a user and rotated in one of the rotation directions 127 so that the nuts 130 and 131 move away from one another (as indicated by arrows 135) as dictated by the rotating threaded portions 124 and 125. Thus, the simple rotation of the grip 126 causes the bar 120 to rotate to simultaneously control movement of the nuts 130 and 131 in opposing directions to simultaneously either increase or decrease tension in the springs 132 and 133.

Figure 1B:
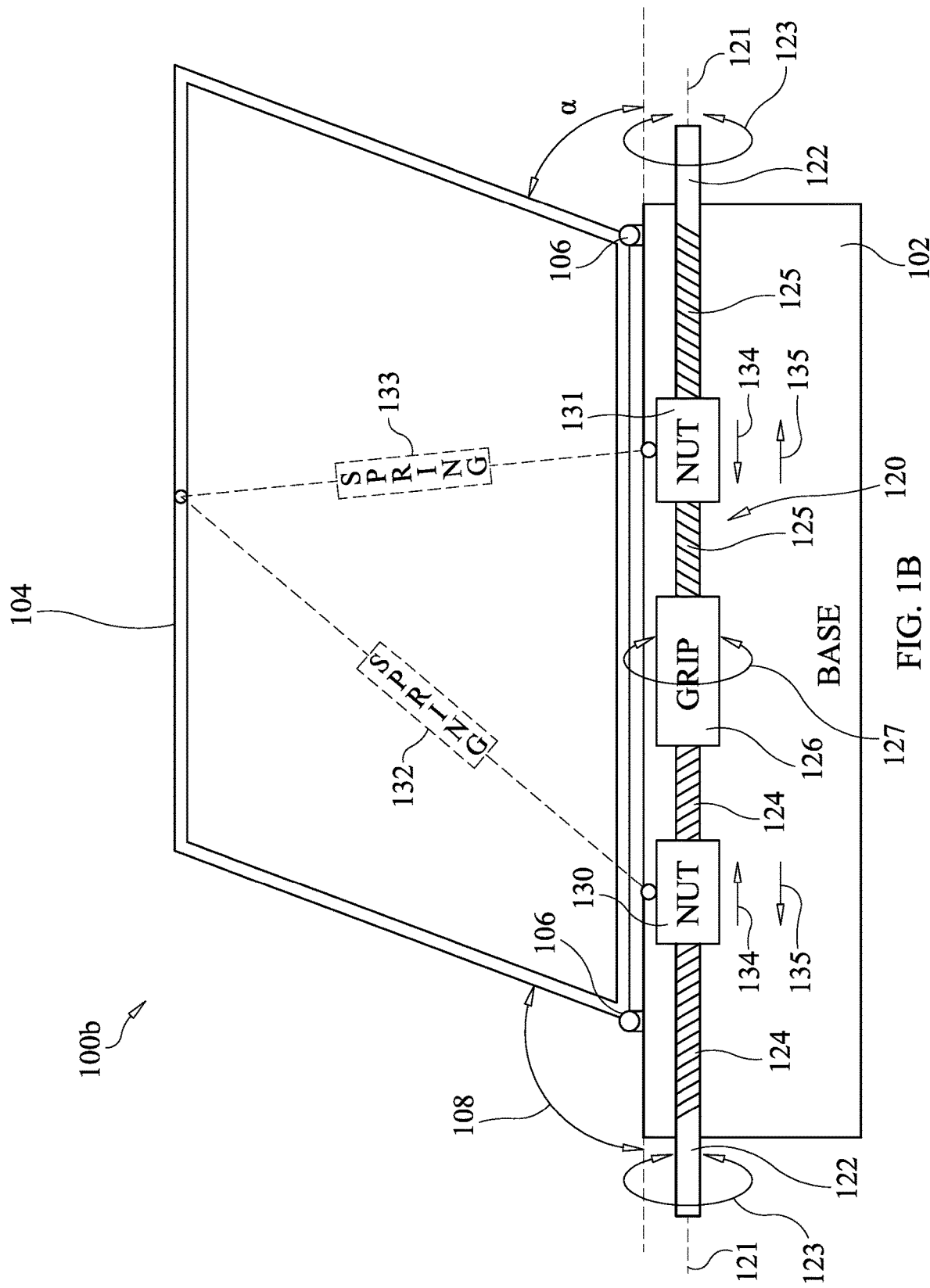
FIGS. 1B-1D illustrate other embodiments of a display stand having a tool-free adjustable torque system in accordance with various aspects as described herein.

In another embodiment illustrated in FIG. 1B, a system 100b is similarly configured to the system 100a as described above but springs 132 and 133 are coupled to the same location on the frame 104. For example, the single location on the frame 104 may be at a central location on the frame 104. In this example, the tension in the springs 132 and 133 is reduced when the grip 126 is rotated to bring about simultaneous opposing motions 134, and the tension in the springs 132 and 133 is increased when the grip 126 is rotated to bring about simultaneous opposing motions 135.

Figure 1C:
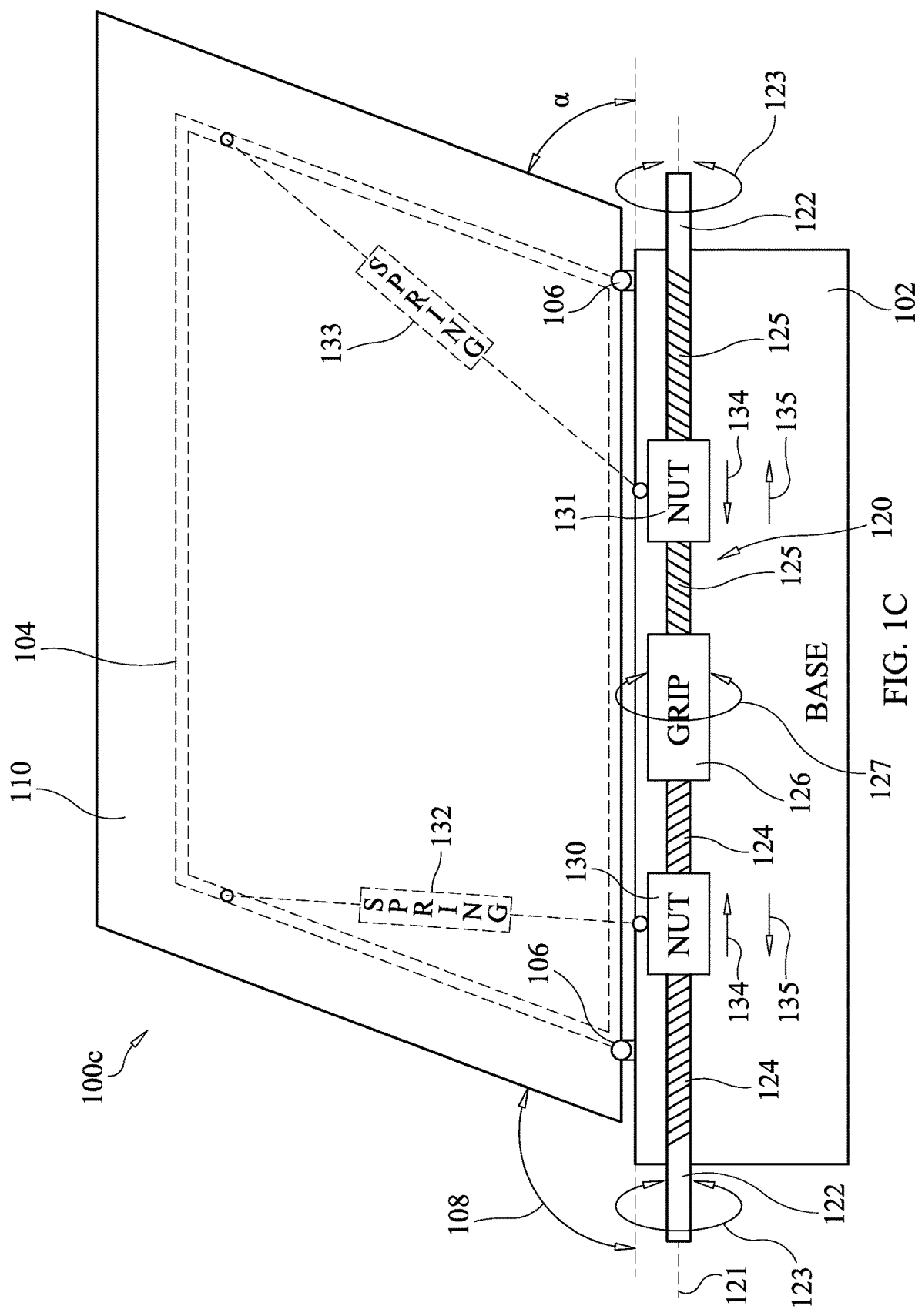

In another embodiment illustrated in FIG. 1C, a system 100c is similarly configured to the system 100a as described above but a platform 110 (e.g., a generally planar structure) is coupled to or is integrated with the frame 104. The platform 110 serves as a support surface for an object (e.g., a screen or display device) to be supported by the system 100c. The frame 104 and the platform 110 tilt (as indicated by the two-headed arrow 108) in unison. Accordingly, the springs 132 and 133 may be attached to the frame 104 or the platform 110.

Figure 1D:
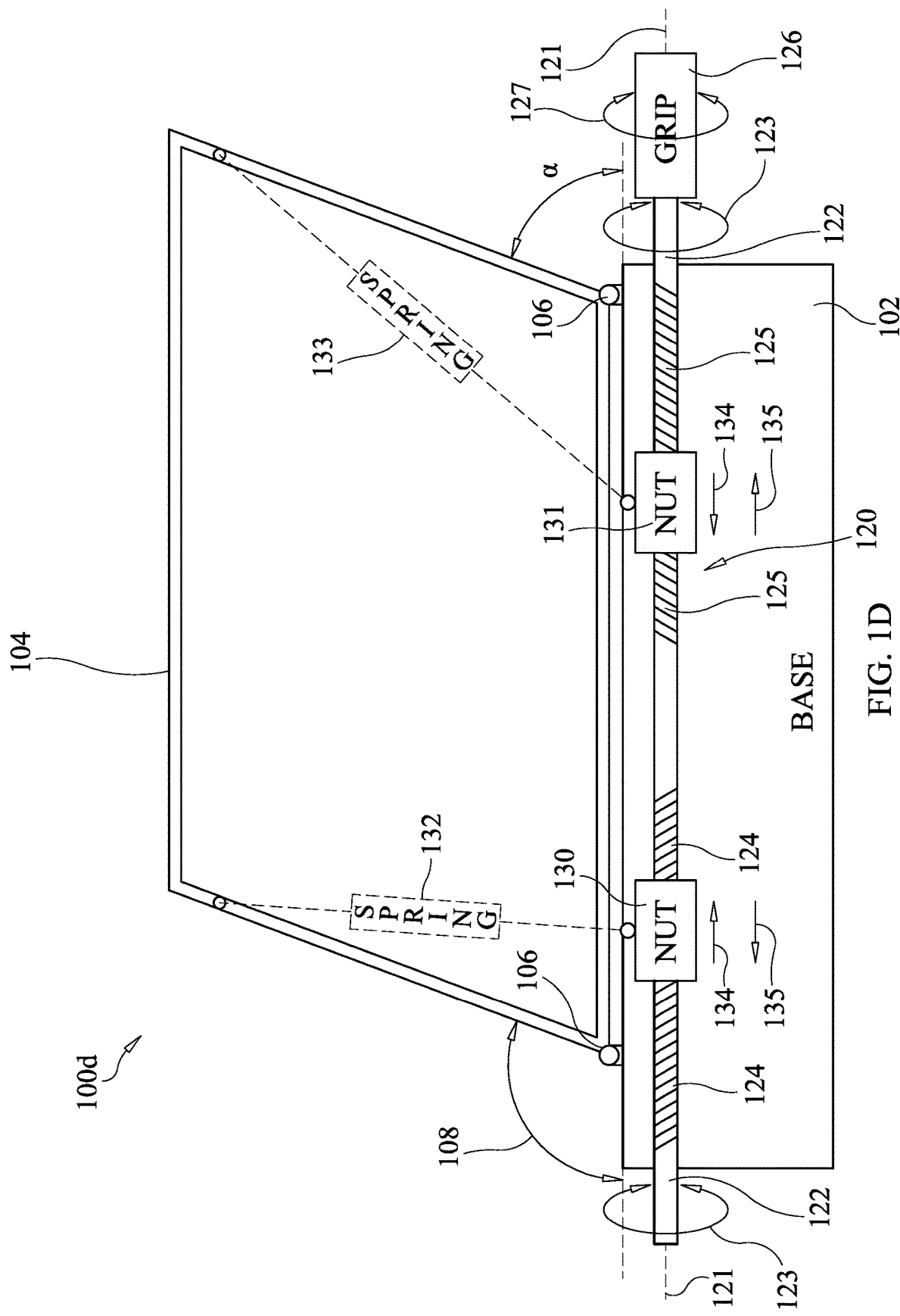

In another embodiment illustrated in FIG. 1D, a system 100d is similarly configured to the system 100a as described above but the grip 126 is coupled to one of the outboard ends 122 of the bar 120 and accessible outside the confines of the base 102. For example, the grip 126 may be located to the side of the base 102 such that it may be gripped and rotated when a user is positioned in front of the system 100d.

Figure 2A:
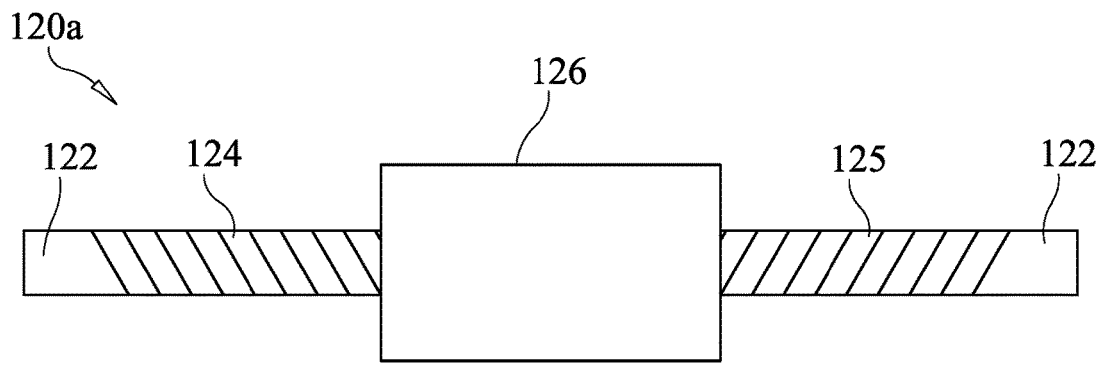
FIG. 2A illustrates one embodiment of a torque-adjustment control bar in accordance with various aspects as described herein.
Figure 2B:
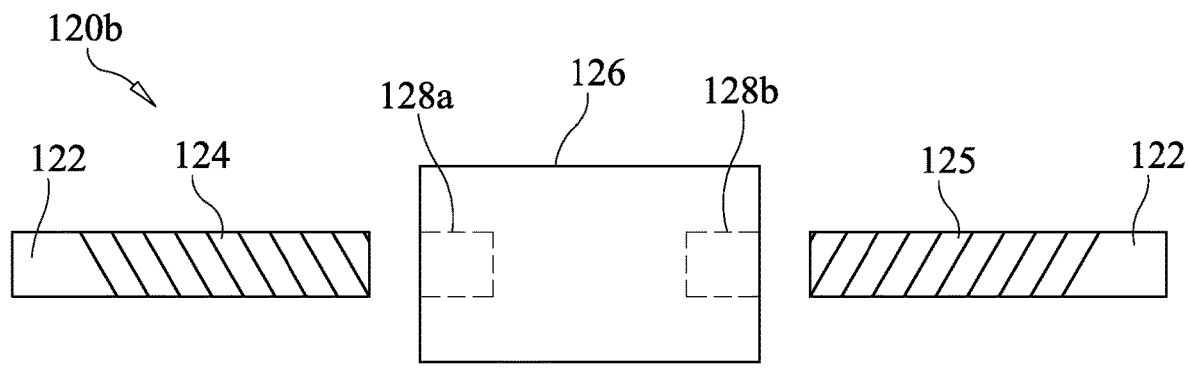
FIG. 2B-2E illustrate other embodiments of torque adjustment control bars in accordance with various aspects as described herein.
Figure 2C:
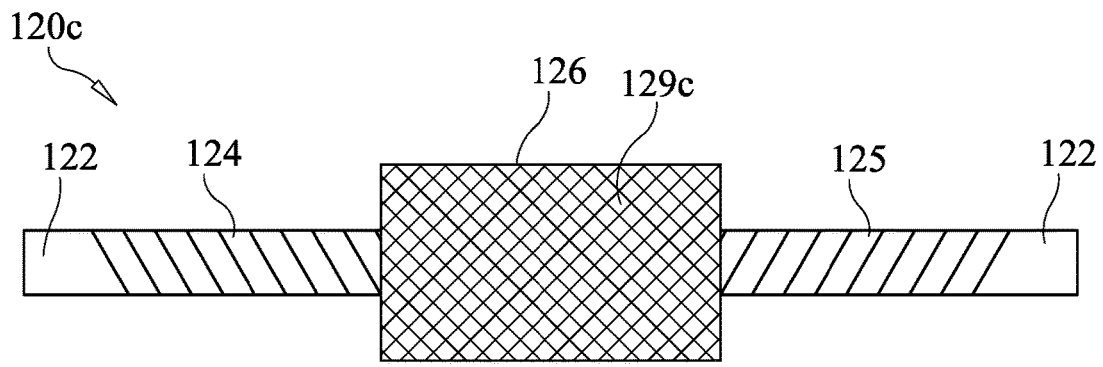
Figure 2D:
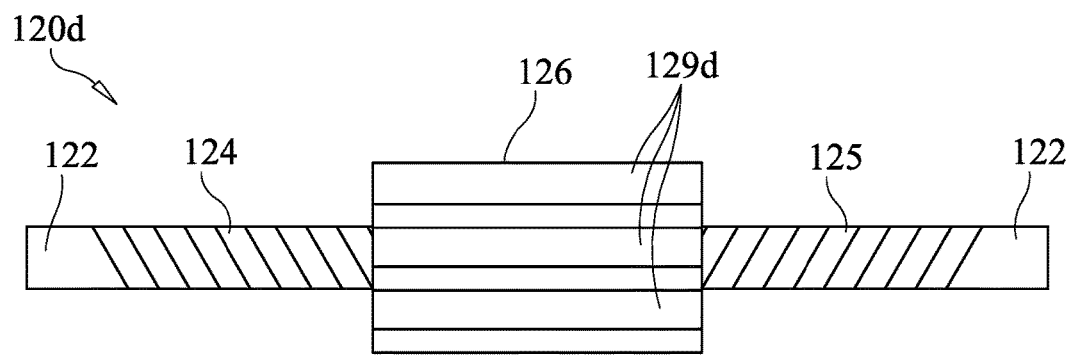
Figure 2E:
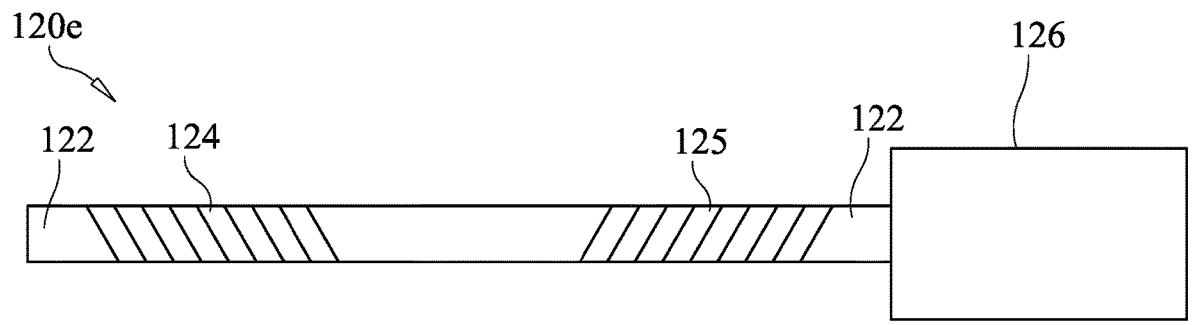

FIGS. 2A-2E illustrate several exemplary embodiments of the bar 120 described above that controls movement of the nuts 130/131 in order to control the tension in corresponding springs 132/133. For example, in FIG. 2A, a bar 120a may be a one-piece bar where the outboard ends 122, the reverse threaded portions 124/125, and the grip 126 are fabricated to be integrated with one another. In FIG. 2B, a bar 120b may include three separate pieces, i.e., separated threaded portions 124 and 125 and a separate grip 126. The grip 126 may be configured with threaded receptacles 128a and 128b for threaded engagement with ends of the threaded portions 124 and 125, respectively. In FIGS. 2C and 2D, the surface of the grip 126 may be configured with relief or other features that facilitate and/or improve the functionality of the grip 126 as a handgrip. For example and as illustrated in FIG. 2C, a bar 120c has the surface of the grip 126 present as a knurled surface as indicated by numeral 129c. In FIG. 2D, a bar 120d has the surface of the grip 126 present as raised ribs 129d. In FIG. 2E, a bar 120e has its grip 126 is disposed at one outboard end 122 such that the grip 126 may be located outside the confines of the system's base as shown above in FIG. 1D.

FIG. 3 illustrates one embodiment of a method 300 by a display stand device configured in accordance with various aspects as described herein. In FIG. 3, the method 300 may start, for instance at block 302 where a display stand device has its platform hingedly coupled at one end thereof to a base, a control bar rotatably supported by the base and including a left-hand threaded portion, a right-hand threaded portion, and a grip configured to enable simultaneous rotation of the left-hand threaded portion and the right-hand threaded portion, a first nut in threaded engagement with the left-hand threaded portion, a second nut in threaded engagement with the right-hand threaded portion, a first spring in tension coupled to the first nut and to the platform, and a second spring in tension coupled to the second nut and to the platform. At block 304, the method 300 includes rotating the grip so that the first nut and second nut move along the control bar in opposing directions to enable simultaneous adjustment of the tension in the first spring and the tension in the second spring.

Additional embodiments will now be described. At least some of these embodiments may be described as applicable in certain contexts for illustrative purposes, but the embodiments are similarly applicable in other contexts not explicitly described.

In one exemplary embodiment, a method is performed by a display stand device having a platform hingedly coupled at one end to a base. A control bar is rotatably supported by the base and includes a left-hand threaded portion, a right-hand threaded portion, and a grip configured to enable simultaneous rotation of the left-hand threaded portion and the right-hand threaded portion. A first nut is in threaded engagement with the left-hand threaded portion, and a second nut is in threaded engagement with the right-hand threaded portion. A first spring in tension is coupled to the first nut and to the platform, and a second spring in tension is coupled to the second nut and to the platform. The grip is rotated resulting in the first nut and second nut being moved along the control bar in opposing directions to enable simultaneous adjustment of the tension in the first spring and the tension in the second spring.

In another exemplary embodiment, the grip comprises a handgrip so that the rotation thereof may be accomplished without tools.

In one exemplary embodiment, a device includes a frame hingedly coupled to a base. A bar having a longitudinal axis is supported by the base for rotation about the longitudinal axis. The bar includes a left-hand threaded portion, a right-hand threaded portion, and a grip configured to enable rotation of the bar about the longitudinal axis. A first nut is in threaded engagement with the left-hand threaded portion, and a second nut is in threaded engagement with the right-hand threaded portion. A first spring is coupled to the first nut and coupled to the frame, and a second spring is coupled to the second nut and coupled to the frame.

In another exemplary embodiment, relief features at a surface of the grip are configured to enable the rotation of the bar without tools.

In another exemplary embodiment, the grip is disposed between the left-hand threaded portion and the right-hand threaded portion.

In another exemplary embodiment, the left-hand threaded portion, the right-hand threaded portion, and the grip are integral with one another.

In another exemplary embodiment, the left-hand threaded portion and the right-hand threaded portion are in threaded engagement with the grip.

In another exemplary embodiment, the first spring and the second spring are coupled to the frame at two unique locations on the frame.

In another exemplary embodiment, the first spring and the second spring are coupled to the frame at one location on the frame.

In another exemplary embodiment, a platform is coupled to the frame for movement with the frame relative to the base.

In another exemplary embodiment, the grip is disposed at a central portion of the bar.

In one exemplary embodiment, a display stand device includes a platform hingedly coupled at one end to a base. A control bar is rotatably supported by the base. The control bar includes a left-hand threaded portion, a right-hand threaded portion, and a grip configured to enable simultaneous rotation of the left-hand threaded portion and the right-hand threaded portion. A first nut is in threaded engagement with the left-hand threaded portion, and a second nut is in threaded engagement with the right-hand threaded portion. A first spring in tension is coupled to the first nut and to the platform, and a second spring in tension is coupled to the second nut and to the platform.

In another exemplary embodiment, handgrip features included at a surface of the grip are configured to enable tool-free rotation of the left-hand threaded portion and the right-hand threaded portion.

In another exemplary embodiment, the grip comprises a handgrip disposed between the left-hand threaded portion and the right-hand threaded portion.

In another exemplary embodiment, the left-hand threaded portion, the right-hand threaded portion, and the grip are integral with one another.

In another exemplary embodiment, the left-hand threaded portion and the right-hand threaded portion are in threaded engagement with the grip.

In another exemplary embodiment, the first spring and the second spring are coupled to the platform at two unique locations on the platform.

In another exemplary embodiment, the first spring and the second spring are coupled to the platform at one location on the platform.

In another exemplary embodiment, the grip comprises a handgrip disposed at a central portion of the control bar.

In another exemplary embodiment, the grip comprises a handgrip disposed between the left-hand threaded portion and the right-hand threaded portion. The handgrip is configured to enable tool-free rotation of the left-hand threaded portion and the right-hand threaded portion.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:
   by a display stand device having a platform hingedly coupled at one end to a base, a control bar rotatably supported by the base and including a left-hand threaded portion, a right-hand threaded portion, and a grip configured to enable simultaneous rotation of the left-hand threaded portion and the right-hand threaded portion, a first nut in threaded engagement with the left-hand threaded portion, a second nut in threaded engagement with the right-hand threaded portion, a first spring in tension coupled to the first nut and to the platform, and a second spring in tension coupled to the second nut and to the platform,
   rotating the grip wherein the first nut and second nut move along the control bar in opposing directions to enable simultaneous adjustment of the tension in the first spring and the tension in the second spring.

2. The method of claim 1, wherein the grip comprises a handgrip, and wherein the step of rotating is accomplished without tools.

3. A device, comprising:
   a base;
   a frame hingedly coupled to the base;
   a bar having a longitudinal axis, the bar supported by the base for rotation about the longitudinal axis, the bar including a left-hand threaded portion, a right-hand threaded portion, and a grip configured to enable rotation of the bar about the longitudinal axis;
   a first nut in threaded engagement with the left-hand threaded portion;
   a second nut in threaded engagement with the right-hand threaded portion;
   a first spring coupled to the first nut and coupled to the frame; and
   a second spring coupled to the second nut and coupled to the frame.

4. The device of claim 3, further comprising:
   relief features at a surface of the grip configured to enable the rotation of the bar without tools.

5. The device of claim 3, wherein the grip is disposed between the left-hand threaded portion and the right-hand threaded portion.

6. The device of claim 3, wherein the left-hand threaded portion, the right-hand threaded portion, and the grip are integral with one another.

7. The device of claim 3, wherein the left-hand threaded portion and the right-hand threaded portion are in threaded engagement with the grip.

8. The device of claim 3, wherein the first spring and the second spring are coupled to the frame at two unique locations.

9. The device of claim 3, further comprising:
   a platform coupled to the frame for movement with the frame relative to the base.

10. The device of claim 3, wherein the grip is disposed at a central portion of the bar.

11. A display stand device, comprising:
    a base;
    a platform hingedly coupled at one end to the base;
    a control bar rotatably supported by the base, the control bar including a left-hand threaded portion, a right-hand threaded portion, and a grip configured to enable simultaneous rotation of the left-hand threaded portion and the right-hand threaded portion;
    a first nut in threaded engagement with the left-hand threaded portion;
    a second nut in threaded engagement with the right-hand threaded portion;
    a first spring in tension coupled to the first nut and to the platform; and
    a second spring in tension coupled to the second nut and to the platform.

12. The display stand device of claim 11, further comprising:
    handgrip features at a surface of the grip configured to enable tool-free rotation of the left-hand threaded portion and the right-hand threaded portion.

13. The device of claim 11, wherein the grip comprises a handgrip disposed between the left-hand threaded portion and the right-hand threaded portion.

14. The device of claim 11, wherein the left-hand threaded portion, the right-hand threaded portion, and the grip are integral with one another.

15. The device of claim 11, wherein the left-hand threaded portion and the right-hand threaded portion are in threaded engagement with the grip.

16. The device of claim 11, wherein the first spring and the second spring are coupled to the platform at two unique locations on the platform.

17. The device of claim 11, wherein the grip comprises a handgrip disposed at a central portion of the control bar.

18. The device of claim 11, wherein the grip comprises a handgrip disposed between the left-hand threaded portion and the right-hand threaded portion, the handgrip configured to enable tool-free rotation of the left-hand threaded portion and the right-hand threaded portion.

\* \* \* \* \*